United States Patent Office 3,798,243
Patented Mar. 19, 1974

3,798,243
PROCESS FOR THE PRODUCTION OF
1-NITROANTHRAQUINONE
Istvan Toth, Bottmingen, Basel-Land, Switzerland, assignor to Sandoz Ltd., Basel, Switzerland
No Drawing. Filed Nov. 30, 1971, Ser. No. 203,459
Claims priority, application Switzerland, Dec. 22, 1970, 18,948/70; June 10, 1971, 8,411/71; July 27, 1971, 11,038/71
Int. Cl. C09b 1/00
U.S. Cl. 260—369
13 Claims

ABSTRACT OF THE DISCLOSURE

By nitration of anthraquinone in an excess of concentrated nitric acid 1-nitroanthraquinone with a very low content of nitration by-products, especially β- and dinitroanthraquinones can be obtained in a very short time if 1 mole of anthraquinone is nitrated with at least 20 moles of nitric acid of at least 90% strength at temperatures between −40° and +35° C. After separation of the solid nitration product the mother lye can be regenerated and used again for nitration. The nitration can be carried out with great advantage in a continuous manner.

For the nitration of anthraquinone to 1-nitroquinone on a technical scale mixed acid ($HNO_3/H_2SO_4$) has been used up to the present, which has the disadvantage that relatively large amount of the by-products of nitration are formed, in particular β-nitroanthraquinone and dinitroanthraquinones. Other nitration processes are known in which anthraquinone is nitrated in an excess of fuming nitric acid, but they are not applicable in technical production and also show disadvantages, notably the fact that the 1-nitroanthaquinone formed is contaminated with substantial amounts of β-nitroanthraquinone and dinitroanthraquinone which can be separated only with great difficulty and with the loss of a considerable proportion of the main product (1-nitroanthraquinone).

It has now been found that 1-nitroanthraquinone can be produced on a technical operating scale in a non-hazardous manner and in a short time by nitration of anthraquinone in an excess of concentrated nitric acid by employing, per mol of anthraquinone, at least 20 mols of a nitric acid of not less than 90% strength and nitrating in the temperature range of −40° C. to +35° C. The 1-nitroanthraquinone is obtained in high purity. After it has been separated the mother lye can be regenerated and used again for the nitration process.

The present invention thus relates to a process for the production of 1-nitroanthraquinone, wherein 1 mol of anthraquinone is nitrated in the presence of at least 20 mols of a nitric acid of not less than 90% strength at temperatures ranging from −40° C. to +35° C. After separation of the 1-nitroanthraquinone the mother lye can if desired be regenerated and used again for the nitration process.

The nitric acid, as stated, must be of at least 90% strength and is preferably of at least 94% or more especially at least 97% strength.

It is employed with advantage in amounts of up to 200 mols, preferably 24 to 50 mols, per mol of the starting anthraquinone. The reaction temperature varies from −40° C. to +35° C., the preferred range being −10° C. to +25° C., and the nitration can be carried out as an adiabatic as well as an isothermic reaction. The temperature, the concentration of the nitric acid and the molar ratio of the nitric acid to the anthraquinone affect the reaction time and the total yield. By adjustment of these parameters the optimal or the most suitable reaction times and yields for a given type of equipment can be reached.

Given the use of approximately 98% nitric acid in the molar ratio of 40:1 to the anthraquinone and temperatures in the region of 15° C., the reaction time is about 20 minutes. The time can be shortened or lengthened by adjusting the strength of the nitric acid, its molar ratio to the anthraquinone and the reaction temperature. Reaction times of 10 minutes or less can be reached.

The short reaction times that can be achieved with the process of this invention enable it to be employed for the usual discontinuous processes and also permits nitration to be carried out continuously.

It is of advantage to control nitration so that the starting anthraquinone is reacted to about 50 to 100%, or preferably 70 to 96%.

On completion of the reaction the 1-nitroanthraquinone can be precipitated by diluting the nitration mixture to an acid content of preferably 60 to 85% and isolated by filtration. The filtrate, after regeneration by one of the known methods, can be used again for further nitration.

The process described above is suitable for cyclic nitration and in particular for continuous nitration processes; it is also employable for the further nitration of 1-nitroanthraquinone to dinitroanthraquinone.

Aminoanthraquinones, in particular 1-aminoanthraquinone, are important intermediates for the production of anthraquinone dyes, which are growing steadily in importance on account of their good properties. Chemically pure intermediates have to be used to obtain these dyes in the desired purity. Using the disclosed process, 1-nitroanthraquinone of high purity can be produced on economical lines for subsequent conversion into 1-aminoanthraquinone of corresponding purity by the known route.

In the following examples the parts and percentages are by weight, unless otherwise stated, and the temperatures in degrees centigrade.

EXAMPLE 1

300 parts of 97.7% nitric acid are cooled to 10° and in 2–3 minutes 25 parts of ground anthraquinone are added. The temperature is held at 13–15° by cooling with an ice bath. After a reaction time of 20 minutes 85.5 parts of ice are added in about 3–5 minutes. The precipitated batch is stirred for 15–30 minutes, cooled and filtered at 15–20° through a G4 glass suction filter. The filtercake is washed until neutral and dried. The product is obtained in a yield of 22.1 parts and in 89% purity, its content of 1-nitroanthraquinone amounting to 64.6% of theory.

EXAMPLE 2

300 parts of 98% nitric acid containing 0.3% $N_2O_3$ are cooled to −5°. At this temperature 25 parts of ground anthraquinone are added. The reaction is allowed to proceed adiabatically for 12 minutes with stirring, then in 1–2 minutes 120 parts of ice are added to the mixture. The suspension formed is cooled to 20° and filtered, the filtercake washed until neutral and dried. The yield is 26.5 parts, the composition of the product being 79% 1-nitroanthraquinone, 17% anthraquinone and 2% 1,5/1,8-dinitroanthraquinone.

EXAMPLE 3

10.4 parts of anthraquinone (grain size range 0.5–0.2 mm.) are poured into 125 parts of 98% nitric acid of 0.08% $N_2O_3$ content at −5° with stirring. The mixture is cooled only to a slight extent so that the reaction temperature takes place more or less adiabatically. The reaction temperature takes the following course: 2 minutes, 0°; 10 minutes, 8°; 17 minutes, 15°; 23.5 minutes, 16.5°. After a reaction time of 24 minutes, when the anthraquinone content is 4% of the initial value (reaction degree 96%), nitration is terminated by the addition of 38.5 parts of ice.

The suspension is cooled to 20°, filtered and the filtercake washed with water until neutral. The process yields 10.25 parts of a product of the composition:

|   | Percent |
|---|---|
| 1-nitroanthraquinone | 91.9 |
| Anthraquinone | 1.1 |
| Dinitroanthraquinone | 7 |

The yield of 1-nitroanthraquinone is 74.5% of theory.

EXAMPLE 4

The same quantities are employed and the same temperatures maintained as in Example 3. After a reaction time of 17 minutes and at an anthraquinone content of 15% of the initial amount (reaction degree 85%), nitration is brought to an end by the addition of 50 parts of ice.

11 parts of a product are obtained which has the composition:

|   | Percent |
|---|---|
| 1-nitroanthraquinone | 80 |
| Anthraquinone | 15 |
| Dinitroanthraquinone | 2.3 |

The yield of 1 nitroanthraquinone is 69.5% of theory.

EXAMPLE 5

20.8 parts of anthraquinone (average grain size 0.5 mm.) are entere dinto 250 parts of 99.5% nitric acid of 0.2% $N_2O_3$ content.

The temperature of the reaction mixture is kept constant at 0°. After reacting for about 16 minutes, when the anthraquinone content is 4% of the initial amount (reaction 96%), nitration is terminated by the addition of 81.5 parts of ice. The further procedure is analogous to that of Example 3. The yield and the composition of the final product agree with what is given in Example 3.

EXAMPLE 6

30 parts of anthraquinone (average grain size 0.5 mm.) are entered into 250 parts of 98.5% nitric acid with an $N_2O_3$ content of 0.25%. The temperature of the reaction mixture is kept constant at 20°. After a reaction time of about 20 minutes, at which point the anthraquinone content is 5% of the initial value (reaction degree 95%), nitration is broken off by the addition of 69 parts of ice. The further procedure is analogous to that of Example 3.

28.1 parts of a product having the following composition are obtained:

|   | Percent |
|---|---|
| 1-nitroanthraquinone | 91 |
| Anthraquinone | 1 |
| Dinitroanthraquinone | 8 |

The yield of 1-nitroanthraquinone is 70% of theory.

EXAMPLE 7 (CONTINUOUS OPERATING PROCEDURE)

The reaction is carried out in a reaction cascade consisting of a mixing vessel M of 250 parts by volume capacity, three reaction vessels $R_1$, $R_2$ and $R_3$, each with a capacity of 3000 parts by volume, and a dilution vessel D. The procedure is as follows. 98% Nitric acid of 0.2% $N_2O_3$ content is allowed to flow through a precooling vessel K in which it is cooled to −10°. The acid is continuously conducted into the mixing vessel M, into which anthraquinone is entered continuously at the same time in the weight ratio of 1:12 to the nitric acid. In this vessel the anthraquinone and nitric acid are stirred to form a suspension. The suspension flows into the reaction cascade, where in the vessel $R_1$ the temperature is maintained at +7° and in the vessels $R_2$ and $R_3$ at +3°. At a rate of flow of 14 litres per hour the time of flow through the cascade is 39.7 minutes. From the cascade the reaction mixture passes continuously into the dilution vessel D, where it is diluted to an acid content of 78% causing precipitation of the greater part of the nitration products. The suspension is filtered at 23°. The solid product obtained amounts to 64.4% of the total nitration products and contains 92.7% 1-nitroanthraquinone (59.7% relative to the total amount of nitration products), which is equivalent to a yield of 59.2% of theory. On further dilution of the mother lye the remaining 35.6% of the nitration products is obtained, which contains 49.0% 1-nitroanthraquinone (17.5% relative to the total amount of nitration products), equivalent to a yield of 17.3% of theory. The total yield of 1-nitroanthraquinone is 76.5% of theory.

EXAMPLE 8

The operating procedure of Example 7 is practised, with the temperatures in the reaction vessels $R_1$, $R_2$ and $R_3$ set at −1°, +11° and +11° respectively. The rate of flow is adjusted to 14 litres per hour and the time of flow to 39.7 minutes.

After the first filtration 67.8% of the nitration products is obtained, of which 89% is 1-nitroanthraquinone (60.2% relative to the total amount of the nitration products) corresponding to a yield of 61.6% of theory. After further dilution and filtration a further 32.2% of the nitration products is isolated which contains 49.0% of 1-nitroanthraquinone (15.8% relative to the total amount of nitration products) corresponding to a yield of 16.2% of theory. The total yield of 1-nitroanthraquinone is 77.8% of theory.

EXAMPLE 9

187.5 parts of 98% nitric acid are entered into a glass vessel and cooled to −5°. At this temperature and with thorough stirring 15.6 parts of anthraquinone are entered in 1 minute. Stirring is continued for 12½ minutes, then nitration is terminated by quickly adding 35 parts of ice ($HNO_3$ concentration: 83%). During this reaction the temperature increases from 12° to 35°. External cooling is applied to ensure that the temperature does not rise to above 40° during the subsequent addition of 40 parts of water, for which 30 minutes is allowed. After the water has been added the reaction mixture is externally cooled to 20° ($HNO_3$ concentration: 70%). The crystalline product is filtered and washed with 330 parts of water until neutral.

The yield is 16.3 parts of a product which gas chromatographic analysis shows to have the following composition:

|   | Percent |
|---|---|
| Anthraquinone | 29 |
| 2-nitroanthraquinone | 0.5 |
| 1-nitroanthraquinone | 65.5 |
| Dinitroanthraquinone | 0.6 |

Having thus disclosed the invention, what I claim is:

1. In a process for the production of 1-nitroanthraquinone wherein anthraquinone is nitrated with an excess of nitric acid, the improvement which comprises carrying out the nitration in the presence of at least 20 mols of nitric acid of at least 90% strength per mol of anthraquinone and at temperatures in the range of −40° C to +35° C.

2. A process according to claim 1 wherein 20 to 200 mols of nitric acid are used per mol of anthraquinone.

3. A process according to claim 2 wherein 24 to 50 mols of nitric acid per mol of anthraquinone are used.

4. A process according to claim 2 wherein nitric acid of at least 94% strength is used.

5. A process according to claim 4 wherein nitric acid of at least 97% strength is used.

6. A process according to claim 2 wherein nitration is carried out at temperatures in the range of −10° C. to +25° C.

7. A process according to claim 2 wherein after separation of the 1-nitroanthraquinone formed, the mother lye is regenerated and is used further for the said nitration process.

8. A process according to claim 7 wherein the nitration process is carried out continuously.

9. A process according to claim 7 wherein the 1-nitroanthraquinone is separated from the mother lye by dilution of the nitration mixture to an acid content of 60 to 85% and subsequent filtration.

10. A process according to claim 2 wherein the nitration process is carried out continuously.

11. A process according to claim 2 wherein the starting anthraquinone is nitrated to over 50%.

12. A process according to claim 11 wherein the starting anthraquinone is nitrated to 70 to 96%.

13. A process according to claim 2 wherein the reaction time is about 10 to 24 minutes.

References Cited
UNITED STATES PATENTS
2,874,168   2/1959   Graham et al. _____260—369

OTHER REFERENCES
Beisler et al.; J.A.C.S. 44, p. 2303 (1922).

LORRAINE A. WEINBERGER, Primary Examiner

E. J. SKELLY, Assistant Examiner

Disclaimer 3,798,243.—*Istvan Toth,* Bottmingen, Base-Land, Switzerland. PROCESS FOR THE PRODUCTION OF 1-NITROANTHRAQUINONE. Patent dated Mar. 19, 1974. Disclaimer filed Nov. 7, 1983, by the assignee, *Fidelity Union Trust Co., Executive Trustee under the Sandoz Trust.*

Hereby enters this disclaimer to claims 1–4 and 6 of said patent.
[*Official Gazette April 30, 1985.*]